United States Patent

Dumont

[11] Patent Number: 5,525,786
[45] Date of Patent: Jun. 11, 1996

[54] MULTIDIRECTIONAL SCAN, PLATFORM PURCHASE CHECKOUT SYSTEM

[76] Inventor: Charles Dumont, P.O. Box 1409, St. John's, Antigua/Barbuda

[21] Appl. No.: 220,005

[22] Filed: Mar. 30, 1994

[51] Int. Cl.⁶ ................................................ G06K 7/10
[52] U.S. Cl. ........................ 235/462; 235/383; 186/5.9
[58] Field of Search ............................... 235/383, 462; 186/59, 60, 61, 66; 209/630, 702, 705; 198/348, 351, 352, 354, 362, 363, 367.1

[56] References Cited

U.S. PATENT DOCUMENTS

| | | | |
|---|---|---|---|
| 3,523,618 | 8/1968 | Nielsen | 198/357 |
| 4,186,477 | 2/1980 | Cary | 219/432 |
| 4,869,045 | 9/1989 | d'Estaintot | 53/384 |
| 4,909,356 | 3/1990 | Rimondi | 186/61 |
| 5,252,814 | 10/1993 | Tooley | 235/383 |
| 5,256,864 | 10/1993 | Rando | 235/462 |

Primary Examiner—Donald T. Hajec
Assistant Examiner—Karl D. Frech
Attorney, Agent, or Firm—Malloy & Malloy

[57] ABSTRACT

A purchase checkout system, adapted for use at a self-service store to expedite the checkout procedures, the system including a support platform having a receiving area and a packaging area at opposite distal ends thereof, and a scanning tunnel centrally disposed on the platform between the receiving area and the packaging area, the tunnel having an entry opening at the receiving area, an exit opening at the packaging area, and a central internal scanning chamber defined by a top wall, a pair of opposite side walls, and the platform, wherethrough items to be purchased are transported and scanned such that price data on an exposed side of the item will be read and transmitted to a checkout register regardless of the position of the item while being transported through the tunnel.

14 Claims, 1 Drawing Sheet

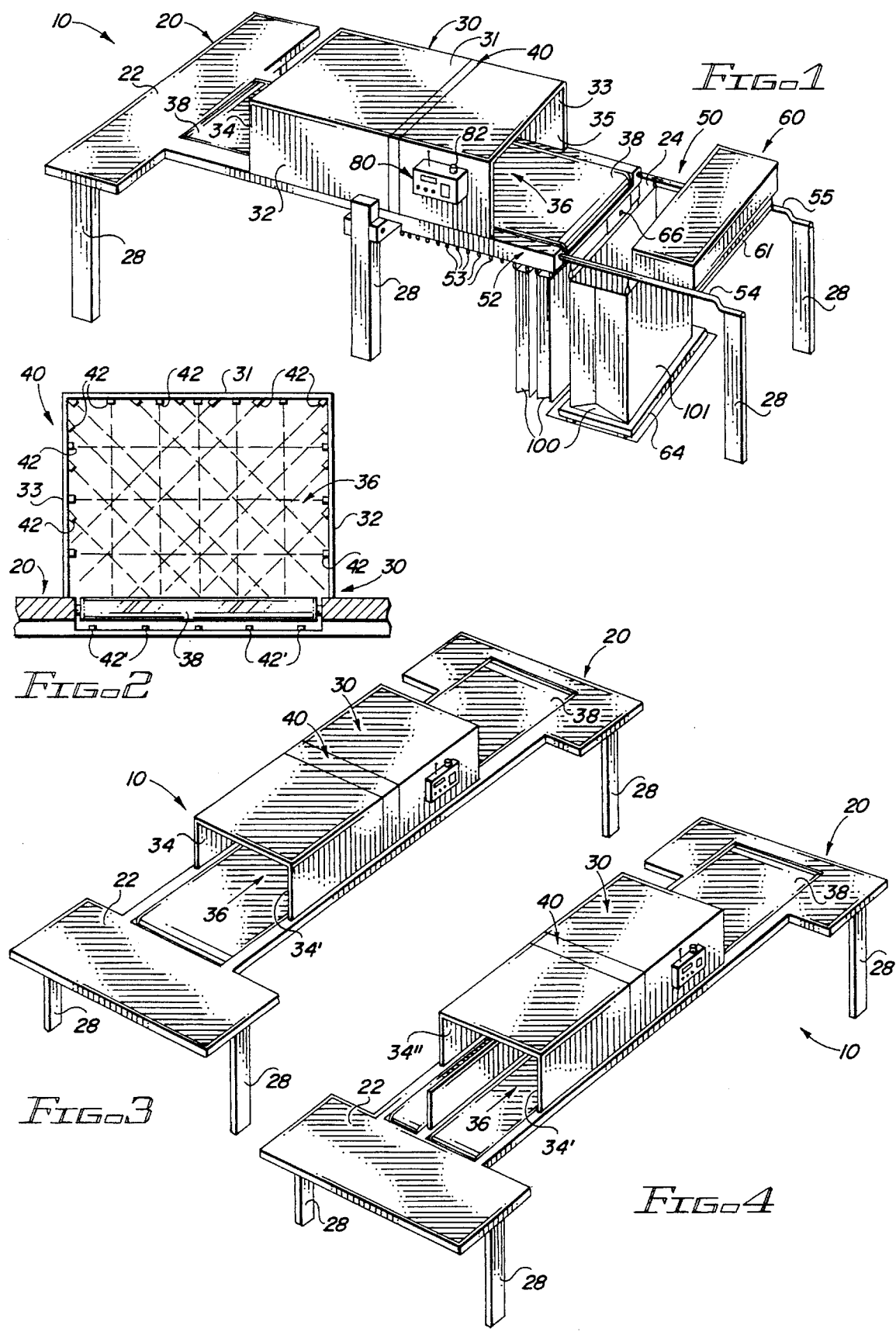

MULTIDIRECTIONAL SCAN, PLATFORM PURCHASE CHECKOUT SYSTEM

BACKGROUND OF THE INVENTION

1. Field of the Invention

The present invention relates to a purchase checkout system to be used to expedite the checkout procedures without the need of a store employee individually scanning every item to be purchased, while properly scanning every item to be purchased, thereby expediting the checkout procedure, eliminating the possibility of missing an item during scanning by careless or dishonest employees, and providing a continuously moving checkout procedure.

2. Description of the Related Art

When shopping at a self-service store such as a grocery store, consumers are often faced with the dilemma of waiting in lengthy lines before checking out. These lengthy lines often result from the necessity that a store cashier handle each item, find the location of the bar code of the item, and scan the particular item, a process which is fraught with error and may result in particular items not being scanned if the store employee is careless or untrustworthy. For these reasons, it would be highly beneficial to have a checkout system which assures that each item is scanned, provides multi-directional scanning such that the item need not be particularly oriented in order for it to be scanned, and does not require a store employee to individually handle and scan each item, thereby expediting the procedures.

In the past, other checkout systems, such as those recited in the patents to Humble, et al., U.S. Pat. No. 4,676,343, Barth, U.S. Pat. No. 4,766,296, and Ono, et al., U.S. Pat. No. 5,013,896, have attempted to increase the efficiency of the checkout system at grocery stores and the like. These systems, however, require individual scanning of each individual item either by a consumer or by a store employee, thereby not fully addressing the problems in the art. Further, other checkout scanning systems, such as those recited in the patents to Collins, Jr., U.S. Pat. No. 5,109,694, and Silverman, U.S. Pat. No. 4,084,742, utilize specifically adapted scanners which while suitable for their intended purpose nonetheless require each individual item to be scanned, a procedure which can be substantially time-consuming as compared with a system which utilizes continuously moving transport means to pass each item through a scanning chamber which automatically scans all exposed sides of the item for pricing data, thereby eliminating the need for an individual store attendant and enable a consumer to continue unloading items from their shopping cart while previously unloaded items are being scanned and transported to a packaging area. The checkout systems of the prior art fail to recite or suggest a checkout system which will eliminate the need for individually manipulating and scanning each item to be purchased by combining a platform having transport means to carry an item to be purchased from a receiving area to a packaging area, through a scanning tunnel which includes a multi-directional scanning cell to read pricing data on an exposed side of the item regardless of its position within the tunnel, as is recited by the present invention.

SUMMARY OF THE INVENTION

The present invention is directed towards a purchase checkout system adapted to be utilized at a self-service store, such as a grocery store, so as to expedite the checkout procedures and eliminate the need for a store attendant to be present at a checkout station in order for the checkout station to be open. The checkout system includes primarily a support platform having a receiving area and a packaging area at opposite distal ends thereof. Centrally disposed atop the support platform, between the receiving area and the packaging area is a scanning tunnel. The scanning tunnel includes an entry opening adjacent the receiving area adapted to allow the passage of items therethrough into the scanning tunnel from the receiving area, and an exit opening adjacent the packaging area adapted to allow items to exit the tunnel into the packaging area. This scanning tunnel is made of a top wall, and a pair of opposite side walls, which together with the support platform upon which the scanning tunnel rests define an internal scanning chamber wherethrough items to be purchased pass. Transport means are included atop the platform to enable items to be purchased to be moved from the receiving area, through the scanning tunnel and to the packaging area. While passing through the internal scanning chamber of the scanning tunnel, each item to be purchased is scanned by multi-directional scanning means disposed within the scanning chamber of the scanning tunnel so as to read the price data positioned on an exposed side of the item. As a result of the orientation of the multi-directional scanning means, the price data will be read regardless of the positioning of the item as it passes through the scanning tunnel. Finally, the checkout system includes means to transmit the price data collected by the multi-directional scanning means to a checkout register where the purchases may be totalled and payment rendered.

It is an object of the present invention to provide a purchase checkout system which will eliminate the requirement that each individual item to be purchase be handled and scanned by either a store employee or a consumer for the passage over a scanning cell.

A further object of the present invention is to provide a checkout system which will automatically scan items to be purchased, without requiring complicated orientation or positioning, and while enabling the consumer to continue unloading a shopping cart or the like during the scanning procedures.

Yet another object of the present invention is to provide a checkout system which will enable all checkout stations of a store to be usable by a consumer without requiring that a store attendant be stationed at the particular checkout station, thereby eliminating extensive waiting in line caused by the accessibility of only a few checkout stations.

BRIEF DESCRIPTION OF THE DRAWINGS

For a fuller understanding of the nature of the present invention, reference should be had to the following detailed description taken in connection with the accompanying drawings in which:

FIG. 1 is a side perspective view of the purchase checkout system including automatic packaging means.

FIG. 2 is a cross-sectional view of the scanning means within the scanning chamber of the purchase checkout system.

FIG. 3 is a front perspective view of a first embodiment of the purchase checkout system.

FIG. 4 is a front perspective view of a second embodiment of the purchase checkout system.

Like reference numerals refer to like parts throughout the several views of the drawings.

DETAILED DESCRIPTION OF THE PREFERRED EMBODIMENT

Shown throughout FIGS. 1–4, the present invention is directed towards a purchase checkout system, generally indicated as 10. As seen in FIGS. 1, 3 and 4, the purchase checkout system 10 includes an elongate support platform 20 supportably mounted on a plurality of support stanchions 28 disposed along the length of the support platform 20. Positioned at opposite distal ends of the support platform 20 are a receiving area 22 and a packaging area 24. The receiving area 22 is where individuals introduce items to be purchased to the checkout system 10 for price scanning, and the packaging area 24 is disposed for convenient packaging of scanned items. Further, the packaging area 24 may be divided to accommodate multiple purchasers during bagging.

Centrally disposed on the support platform 20, between the receiving area 22 and packaging area 24 is a scanning tunnel 30. The scanning tunnel 30 includes a top wall 31 and a pair of opposite side walls 32 and 33, and is generally elongate. Items to be scanned enter the scanning tunnel 30 through an entry opening 34 adjacent the receiving area 22, pass through an internal scanning chamber 36, and exit the scanning tunnel 30 through an exit opening 35 adjacent the packaging area 24. The internal scanning chamber 36 is defined by the top wall 31, opposite side walls 32 and 33, and support platform 20. Passing through the internal scanning chamber 36 so as to move items to be purchased through the scanning tunnel 30, is a conveyor belt 38. The conveyor belt 38 which can either run at a constant speed or be adapted to stop moving when a back log of items reaches the packaging area 24, guides items through the internal scanning chamber 36 where centrally disposed multi-directional scanning means 40 can read the price of each item passing therethrough. The multi-directional scanning means 40 are specifically adapted such that each item passing therethrough will be scanned regardless of its position while passing through the scanning means 40.

Shown in FIG. 2, a preferred embodiment of the multi-directional scanning means 40 includes a plurality of individual bar code scanning cells 42 disposed along the interior of the top wall 31 and opposite side walls 32 and 33 of the scanning tunnel 30. These scanning cells 42 are disposed in a variety of orientations such that the entire area within the scanning tunnel 30 will be properly scanned. Also, in an alternate embodiment, the conveyor belt 38 is transparent and a number of additional scanning cells 42' are disposed on the platform 20 beneath the conveyor belt 38, thereby providing scanning rays being emitted from all directions. Further, alarm 82 is included as part of the checkout system 10 such that items which pass through the scanning means 40 and are not properly scanned will trigger the alarm and signal to an attendant that that item must pass through the scanning tunnel 30 once again. Included with the alarm 82 are means to transmit price data to a checkout register, in the form of a control box 80. The control box 80 contains price data such that the appropriate price can be attributed to a particularly scanned item and such that the completed pricing information may be transmitted to a checkout station. The checkout station may either be connected with the purchase checkout system 10 or be at a remote location.

Shown in FIGS. 3 and 4 are two alternative embodiments of the purchase checkout system. FIG. 3 illustrates the standard purchase checkout system 10 which includes a single entry opening 34 to the scanning tunnel 30 wherethrough items to be purchased may pass. Shown in FIG. 4, there may be multiple entry openings 34' and 34" and multiple conveyors 38' and 38" leading into the scanning tunnel 30. The multiple entry openings 34' and 34" at different sizes will be specifically adapted such that only items of a specified range of sizes may fit therethrough, thereby facilitating proper scanning and further facilitating packaging at the packaging area 24. The number of entry openings 34 or conveyors 38 may effectively be varied to meet the particular needs of a circumstance and, accordingly, variations thereof are consistent with the intent claimed.

Turning to FIG. 1, a preferred embodiment of the purchase checkout system 10 includes automatic packaging means 50 which enables items which have passed through the scanning tunnel 30 to be immediately placed in bags 100 for facilitated portability. Included as part of the automatic packaging means 50 is a bag dispenser 52. In the preferred embodiment, the bag dispenser 52 includes a pair of elongate rails 54 and 55 through which a number of bag graspers 53 may slide. The bag graspers 53 which may be in the form of clips or hooks are adapted to hold a number of packaging bags 100 until needed. When needed, the bag graspers 53 slide a bag to the packaging area 24 and open it such that the open bag 100 is positioned adjacent the conveyor belt 38 for facilitated passage of items from the conveyor belt into the opened bag 101. While the opened bag 101 is being filled, capacity detection means 64 and 66 are disposed to measure when the opened bag 101 is sufficiently full. In the preferred embodiment, the capacity detection means includes a scale 64 positioned beneath the opened bag 101 to determine when a maximum weight has been attained, and a scanning eye 66 adapted to detect when a maximum height level within the opened bag 101 has been achieved. When the bag is determined to be filled by the capacity detection means 64 and 66, the bag is closed and moved to a sealing station. Simultaneously with the filled bag being moved to the sealing station, a new bag 100 is dispensed and opened in the packaging area 24. The sealing station, adjacent the packaging area 24 includes a heat sealer 60 having a pair of retractable sealing bars 61 which extend down about a closed bag positioned beneath the heat sealer 60 and appropriately seal the bag. After sealing, the full and sealed bag is moved to the end of the tracks 54 and 55 for facilitated dispensing and removal by a consumer.

The cited embodiments of the present invention are the preferred embodiments at the time of the invention. Variations consistent with the intent expressed by the claims and in accordance with the doctrine of equivalents should also be included.

Now that the invention has been described, what is claimed is:

1. A multidirectional scan, platform purchase checkout system comprising:

a support platform, said support platform including a receiving area and a packaging area disposed at opposite distal ends thereof, a scanning tunnel centrally disposed on said platform between said receiving area and said packaging area, said scanning tunnel including a top wall and a pair of opposite side walls, said scanning tunnel further including an entry opening adjacent said receiving area, an exit opening adjacent said packaging area, and an internal scanning chamber defined by said top wall, said pair of opposite side walls, and said platform, said entry opening of said scanning tunnel being divided into a plurality of different sized sizing entry openings, each of said sizing entry openings being adapted to receive only items of a designated range of sizes therethrough, transport means structured and disposed to move an item to be purchased from said receiving area, through said scanning chamber of said scanning tunnel, and to said packaging area, multi-directional scanning means positioned within said scanning chamber of said scanning tunnel and structured and disposed to read price data on an exposed side of the item to be purchased regardless of the position thereof, and means to transmit said price data to a checkout register.

2. A checkout system as in claim 1 wherein said multi-directional scanning means includes a plurality of scanning cells in said opposite side walls and said top wall of said scanning tunnel.

3. A checkout system as in claim 2 wherein said transport means includes a conveyor belt movably positioned on said platform.

4. A checkout system as in claim 3 wherein said transport means includes a plurality of said conveyor belts, each corresponding one of said sized entry openings.

5. A checkout system as in claim 3 wherein said conveyor belt is substantially transparent.

6. A checkout system as in claim 5 wherein said scanning means includes a scanning cell disposed beneath said conveyor belt and structured and disposed to scan through said transparent conveyor belt.

7. A checkout system as in claim 1 further including automatic packaging means structured and disposed to package items upon arrival at said packaging area so as to facilitate portability by a consumer.

8. A checkout system as in claim 7 wherein said packaging means includes a bag dispenser structured and disposed to open and position a single bag, from a reserve stock of bags, at said packaging area upon filling of a previous bag, said bag dispenser having a pair of oppositely disposed tracks wherein a plurality of bag holders are slidably disposed.

9. A checkout system as in claim 8 wherein said packaging means further includes capacity detection means structured and disposed to determine when said single bag opened at said packaging area is sufficiently filled and, accordingly, initiate closing of said single bag.

10. A checkout system as in claim 9 wherein said capacity detection means includes a scale structured and disposed to measure the weight of items contained within said single bag opened at said packaging area.

11. A checkout system as in claim 10 wherein said capacity detection means includes a scanning eye structured and disposed to determine when a maximum height level of items within said single bag opened at said packaging area has been attained.

12. A checkout system as in claim 11 wherein said packaging means further includes bag sealing means structured and disposed to seal a filled bag in a closed position.

13. A checkout system as in claim 12 wherein said sealing means includes a heat sealer.

14. A checkout system as in claim 1 further including an alarm structured and disposed to signal when an item which has passed through said scanning chamber has not been properly scanned.

* * * * *